June 6, 1961 A. J. MENGIS ET AL 2,986,975
APPARATUS FOR MAKING BAGS
Filed April 28, 1958 8 Sheets-Sheet 1

FIG. 1.

INVENTORS
ALBIN JOSEPH MENGIS
MAURICE ANDREW NYQUIST &
ADOLPH VANDERWOUDE
BY Busser, Smith & Harding
ATTORNEYS

FIG. 3.

INVENTORS
ALBIN JOSEPH MENGIS
MAURICE ANDREW NYQUIST &
ADOLPH VANDERWOUDE
BY Busser, Smith & Harding
ATTORNEYS June 6, 1961 A. J. MENGIS ET AL 2,986,975
APPARATUS FOR MAKING BAGS
Filed April 28, 1958 8 Sheets-Sheet 4

INVENTORS
ALBIN JOSEPH MENGIS
MAURICE ANDREW NYQUIST &
ADOLPH VANDERWOUDE
BY Busser, Smith & Harding
ATTORNEYS June 6, 1961 A. J. MENGIS ET AL 2,986,975
APPARATUS FOR MAKING BAGS
Filed April 28, 1958 8 Sheets-Sheet 5

INVENTORS
ALBIN JOSEPH MENGIS
MAURICE ANDREW NYQUIST &
ADOLPH VANDERWOUDE
BY Busser, Smith & Harding
ATTORNEYS June 6, 1961 A. J. MENGIS ET AL 2,986,975
APPARATUS FOR MAKING BAGS
Filed April 28, 1958 8 Sheets-Sheet 6

INVENTORS
ALBIN JOSEPH MENGIS
MAURICE ANDREW NYQUIST &
ADOLPH VANDERWOUDE
BY Dresser, Smith & Harding
ATTORNEYS

United States Patent Office 2,986,975
Patented June 6, 1961

2,986,975
APPARATUS FOR MAKING BAGS
Albin Joseph Mengis, Philadelphia, Maurice Andrew Nyquist, Broomall, and Adolph Vanderwoude, Philadelphia, Pa., assignors, by mesne assignments, to W. Inc., Philadelphia, Pa., a corporation of Pennsylvania
Filed Apr. 28, 1958, Ser. No. 731,323
10 Claims. (Cl. 93—8)

This invention relates generally to bag making machines of the type in which the component parts operate in predetermined time relation and act upon a continuously running strip of bag material to continuously produce completed bags provided with finger opening reinforcing patches, and more particularly to an improved construction affording particular advantage with regard to the application of said finger opening reinforcing patches.

The aforesaid type of machine generally operates continuously to advance a strip or web of bag material and one or more strips or webs of reinforcing material. Finger opening reinforcing patches are automatically severed from the latter and applied to the former prior to formation of the web of bag material into a tube from which individual bag lengths are finally separated. Known devices for applying these finger opening reinforcing patches to the web of bag material have not proven entirely satisfactory because they necessitate a shut down of the machine for effecting even a comparatively rough readjustment when it is found that the reinforcing patches are being misapplied lengthwise of the work, or when it is found that the patches in one row of two laterally spaced rows thereof are being misapplied lengthwise of the work each relative to its companion patch in the other row. Accordingly, it is a principal object of the present invention to provide a bag making machine of the type aforesaid with means operable while the machine is in full operation for correcting such misapplications of the reinforcing patches to the bag material.

When the aforesaid type of mechanism is set up for producing bags of one length and it is desired to change over to the production of bags of a different length, the changeover normally entails an unduly complicated procedure including dismantling major parts of the machine, e.g., the mechanism for gumming the bag material. Accordingly, another principal object of the present invention is to provide for such a machine a gumming mechanism that materially facilitates such change-overs.

Other objects and advantages of the present invention will appear more fully hereinafter, it being understood that the present invention consists in the combination, construction, location and relative arrangement of parts, all as will be more fully described hereinafter, as is shown in the accompanying drawings and as will be pointed out in the appended claims.

Referring to the drawings, and particularly to FIGS. 1, 2, 3 and 14 the exemplary bag making machine constructed in accordance with and embodying the principles of the present invention comprises a pair of upright opposite side frames 18 and 20 that revolubly mount transversely extending rollers, respectively designated 22, 24, 26 and 28, a pair of opposite side frame extensions 30 and 32 that revolubly mount transversely extending rollers 34 and 36, and a pair of brackets 38 and 40 that revolubly mount a pair of transversely extending rollers 42 and 44. The rollers aforesaid are suitably arranged for advancing a web of bag material 46 from the front of the machine rearwardly, then upwardly and finally downwardly and forwardly as indicated by the arrows.

Immediately to the rear of the roller 28 is a main drive shaft 48 the opposite end portions of which are carried respectively by the side frames 18 and 20. This shaft derives power from a suitable drive including a chain sprocket 50 and a link belt 52 and is operatively connected with certain of the web draw rollers aforesaid for actuating the same thereby to advance the web 46 through the machine at a constant speed. In addition to the chain sprocket 50 the shaft 48 carries suitable elements 54 for mounting perforators 56. In the operation of the machine, for each revolution of the shaft 48 the web 46 is provided with a transversely extending line of perforations. The distances between each two successive lines of perforations are equal, the successive bag paper sections thus formed being folded automatically into bags. The construction and operation of the machine so far as concerns guiding, advancing and perforating the web of bag paper is conventional and therefore a further detailed description is deemed unnecessary for a full understanding of the present invention. After the web 46 is perforated an adhesive agent or gum is applied thereto and then finger hole reinforcing patches are applied to the gummed areas. The means for gumming the web 46 will now be described.

Close adjacent the roller 36 is a gumming roller shaft 58 the opposite end portions of which are carried respectively by bearing units 60, each of which units comprises a bearing and housing 62 that is slidable in a bearing frame fixed on the associated side frame extension 30 or 32 including a pair of guide members 64, a cross piece 66, a screw 68 and a handwheel 70. These units extend upwardly and rearwardly from the shaft 58, parallel to one another.

Referring particularly to FIGURES 8, 9, 10 and 12, respectively over axially spaced portions of the shaft 58 are a pair of suitable applicator or gumming roller units comprising cylindrical elements 72 respectively mounting a pair of shoes 74 and a pair of plates 76. These shoes and plates are arcuately shaped in transverse section. The plates 76 are fastened to the elements 72 by screws 78. The shoes 74 are provided with main body parts 80 and suitable treads 82. For securing the shoes 74 in place a pair of flanged caps 84 are fitted over the shaft 58 and respectively over the opposite end portions of the element 72, the shoe main body 80 and the plate 76 of the associated applicator unit, being secured in place by screws 86.

Mounted upon one end portion of the shaft 58 is a gear 88 that meshes with a gear 90 which is carried by a stub shaft 92, the latter being carried by the side frame extension 30 of the machine. The gear 90 meshes with a gear 94 that is mounted upon one end of a shaft 96 which extends across the machine, under the roller 36, with opposite end portions journaled in the side frame extensions 30 and 32.

Under the applicator units, to the rear of the shaft 96, are a pair of laterally spaced reservoir or gum box units each of which comprises a gum box 98 that is secured to the frame of the machine by a clamp 100. A shaft 102 extends across the fore end of the gum box 98, and opposite end portions of the shaft are journaled respectively in the opposite side walls of the gum box. On the shaft 102, between the opposite side walls of the gum box is a gum pick-up roller 103, and on one end of the shaft 102 is a gear 104. The gears 104 respectively mesh with a pair of gears 106 carried by the shaft 96. The box 98 is mounted upon the slidable wedge 100 which may be manually shifted fore and aft by manipulation of a hand wheel 108 that is secured to the end of a screw 110 to shift the gum box vertically. In the operation of the machine for each revolution of the main drive shaft 48, the gumming roller shaft 58 makes one revolution thereby to apply gum at regular intervals to corresponding areas of each successive bag length or section of the web 46. In the event that it is desired to discontinue production of bags of one length and to change over to the production of bags of a different length, the perforator 56 is reset as required and a corresponding adjustment of the gummer mechanism is made. This adjustment is effected by demounting the gear 88 and the gum applicator shoes 74 from the shaft 58, manipulating the hand wheels 70 thereby to shift the shaft 58 laterally to the desired position and then replacing the shoes 74 with different shoes of the size necessary for establishing contact of the gum applying surface of the treads 82 with the roller 36, and replacing the gear 88 with a different gear of the size necessary for meshing with the gear 90.

The means for applying finger hold reinforcing patches includes a pair of units 112 and 114 that are carried by a pair of cross beams 116 the latter being in turn carried by the side frame extensions 30 and 32. The patch applying unit 112 is disposed on the upright longitudinally extending median plane of the machine. This unit is provided with a frame having a pair of upright opposite side members 118 and 119 and a bottom member 120. For securing the unit to the cross beams 116 a clamp part 122 and screws 124 are provided.

Extending through and journaled in the rear end portions of the members 118 and 119 is a shaft 126 upon which is mounted a chain sprocket 128. Extending through and journaled in the fore end of the member 118 is a stub shaft 130 upon the opposite ends of which are mounted respectively a chain sprocket 132 and a gear 134. Extending in spaced parallel relation to the shaft 126, inwardly from one side of the machine, is a worm wheel shaft 136 the inner terminal portion of which is journaled in the member 118. Rigid with shaft 136 is a laterally extending arm 138 that carries a chain sprocket 140. Carried by the member 118 is a chain tightening device comprising an arm 142 pivoted at 144 and biased by a tension spring 146. A link belt 148 is trained over a chain sprocket 150 carried by the arm 142 and additionally over the chain sprockets 128, 140 and 132, all being disposed on the outer side of member 118 as shown. In the operation of the machine, when the worm wheel shaft 136 is turned (by means to be described) the sprocket 140 is swung in an arc by the arm 138 and simultaneously the chain tightening device operates as required to keep the chain suitably taut.

Extending between and journaled in corresponding areas of members 118 and 119 to the rear of stub shaft 130 are a pair of shafts 152 and 154 respectively mounting coacting rollers 156 and 158 and meshed gears 160 and 162, and extending between and journaled in corresponding areas of members 118 and 119 forwardly of the stub shaft 130 are a pair of shafts 164 and 166 respectively mounting coacting rollers 168 and 170 and meshed gears 172 and 174. The gears 160, 162, 172 and 174 are all on the inner side of member 118 with the gear 134, which latter gear meshes with the gears 160 and 172. Suitably mounted upon the roller 170 in diametrically opposed relation to one another are a pair of cutter elements 176, and suitably mounted upon the roller 168 in diametrically opposed relation to one another are a pair of cutter blocks 178. Extending upwardly and rearwardly from the members 118 and 119 is a rack comprising a pair of brackets 180 and a set of three guide bars 182. In the operation of the machine a web 184 of patch paper is payed out from a roll thereof that is revolubly mounted upon a suitable bracket 186. The web 184 threads between the guide bars 182, passes between the rollers 156 and 158 and then between the rollers 168 and 170. This web of patch paper is pulled from the roll principally by the rollers 156 and 158, is cut into suitable lengths by the coacting cutter elements 176 and 178 respectively mounted upon the rollers 170 and 168 and fed on to the bag paper web 46 by the pair of pinch rollers 42 and 44.

The patch applying unit 114 is disposed in laterally spaced relation to the patch aplying unit 112 and is provided with a frame having a pair of upright opposite side members 192, 194 and a bottom member 196. For securing the unit to the cross beams 116 a clamp part 122 and screws 124 are provided.

The shaft 126 additionally extends through and is journaled in the rear end portions of the members 192 and 194, and additionally mounts a gear 198. Extending through and journaled in the fore end of the member 192 is a stub shaft 200 revolubly mounting a gear 202. Extending between and journaled in corresponding areas of members 192 and 194 to the rear of stub shaft 200 are a pair of shafts 204 and 206 respectively mounting coacting rollers 208 and 210 and meshing gears 212 and 214, the gear 212 being meshed with the gear 198. Extending between and journaled in corresponding areas of numbers 192 and 194 forwardly of the stub shaft 200 are a pair of shafts 216 and 218 respectively mounting coacting rollers 220 and 222 and meshed gears 224 and 226. The gears 212, 214, 224 and 226 are all on the inner side of the member 194 with the gear 202, which latter gear meshes with the gears 212 and 224. Suitably mounted upon the roller 222 in dimetrically opposed relation to one another are a pair of cutter elements 228, and suitably mounted upon the roller 220 in diametrically opposed relation to one another are a pair of cutter blocks 230. Extending upwardly and rearwardly from the members 192 and 194 is a second rack comprising a pair of brackets 180 and a set of three guide bars 182. In the operation of the machine, a second web 184 of patch paper is payed out from a roll thereof that is revolubly mounted upon a second bracket 186 this web threads between the guide bars 182, passes between the rollers 208 and 210 and then between the rollers 220 and 222. The web is pulled from the roll principally by the rollers 208 and 210. It is cut into suitable lengths by the coacting cutter elements 228 and 230 respectively mounted upon the rollers 222 and 220 and fed onto the bag paper web 46 by the pair of pinch rollers 42 and 44.

Figure 1:
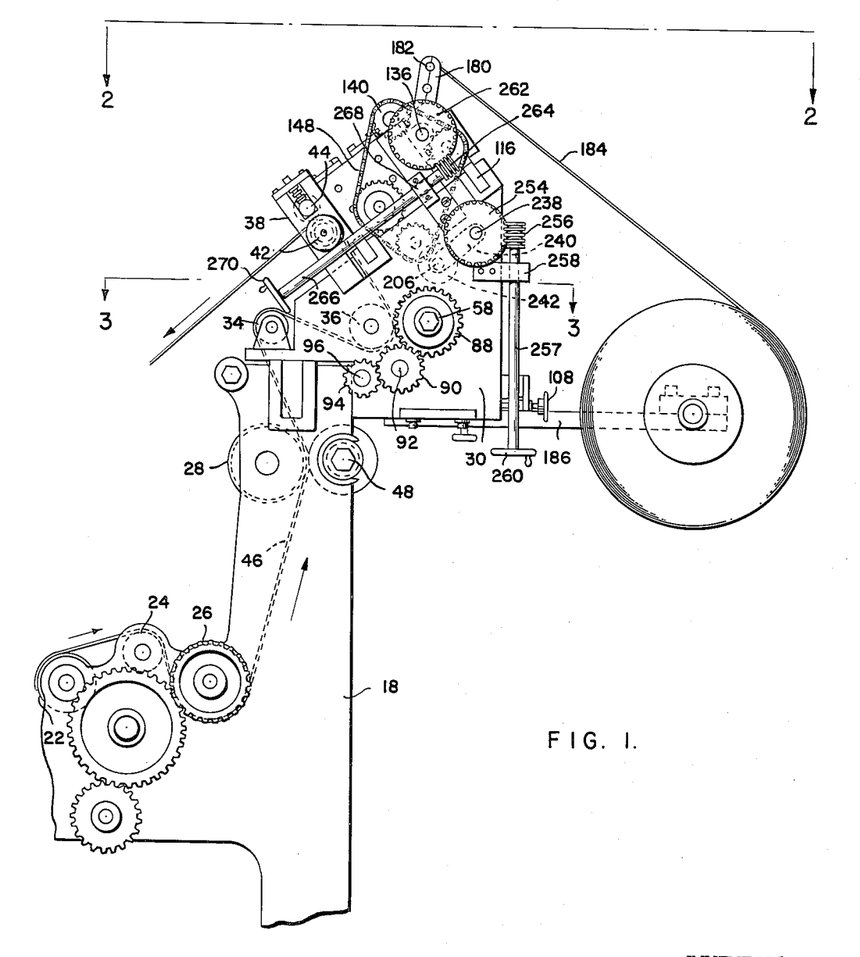
FIGURE 1 is a side elevation of a bag making machine constructed in accordance with and embodying the principles of the present invention.
Figure 2:
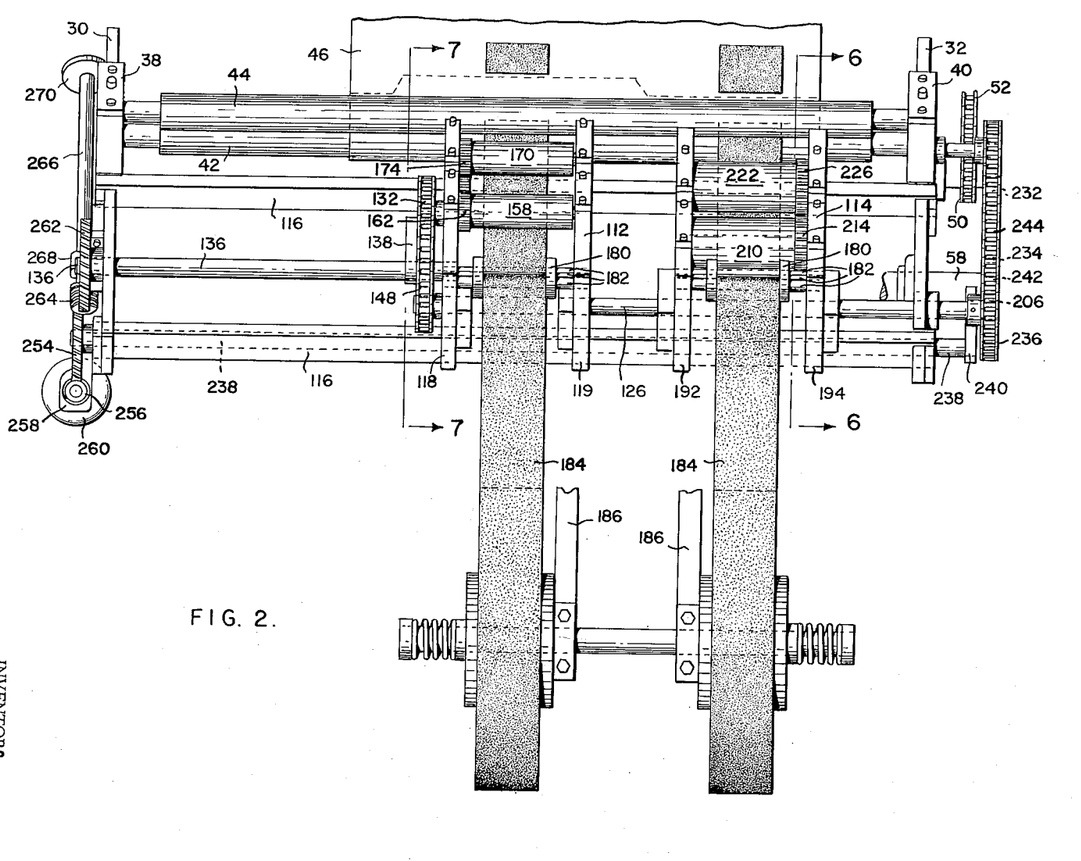
FIGURE 2 is a fragmentary enlarged plan view of the machine shown in FIGURE 1.
Figure 3:
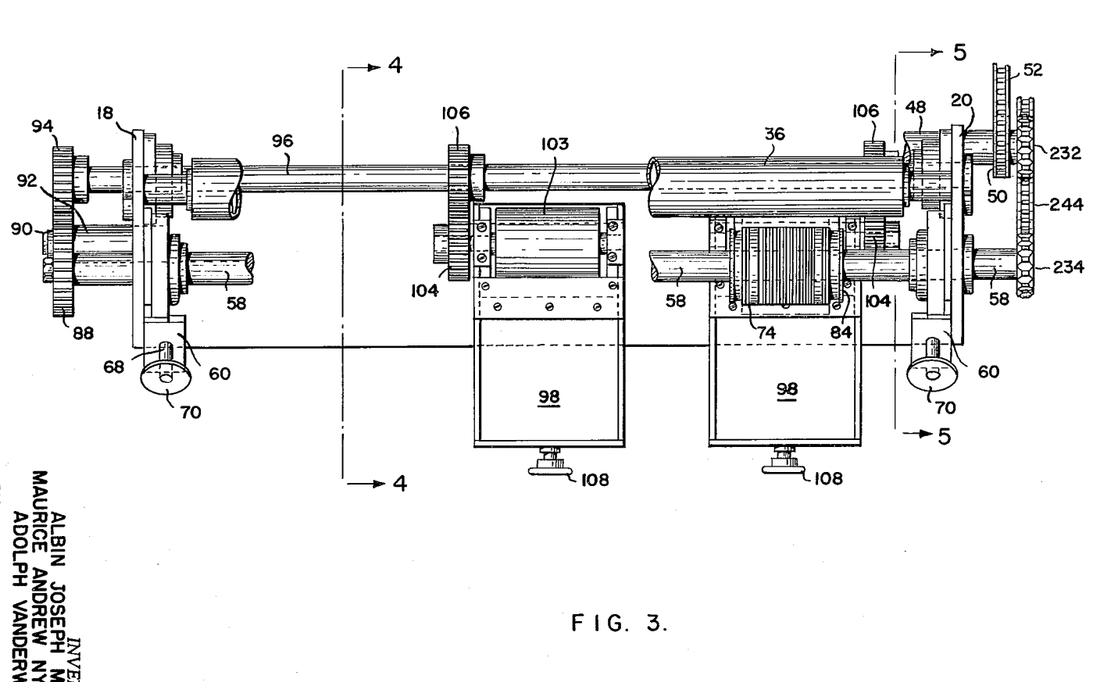
FIGURE 3 is an enlarged horizontal section on line 3—3 of FIGURE 1.
Figure 4:
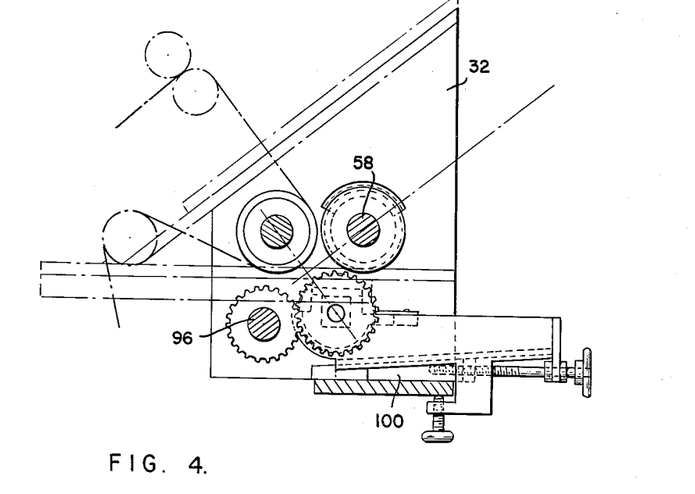
FIGURES 4 and 5 are vertical sections respectively on lines 4—4 and 5—5 of FIGURE 3.
Figure 5:
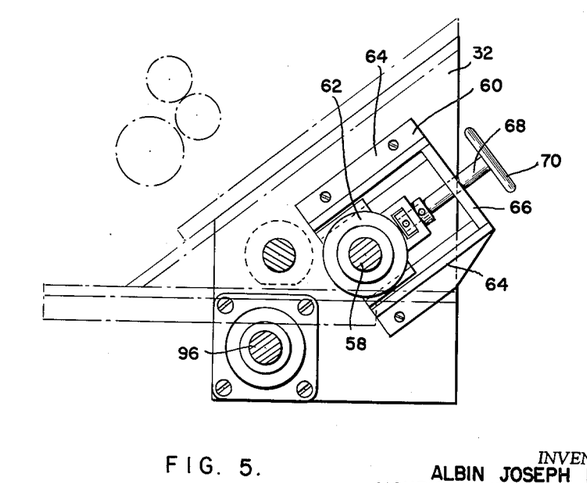
Figure 6:
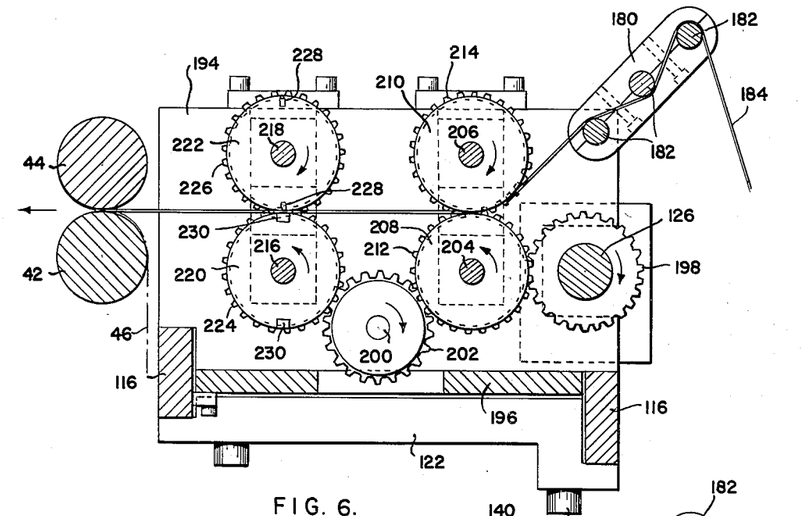
FIGURE 6 is an enlarged section on line 6—6 of FIGURE 2.
Figure 7:
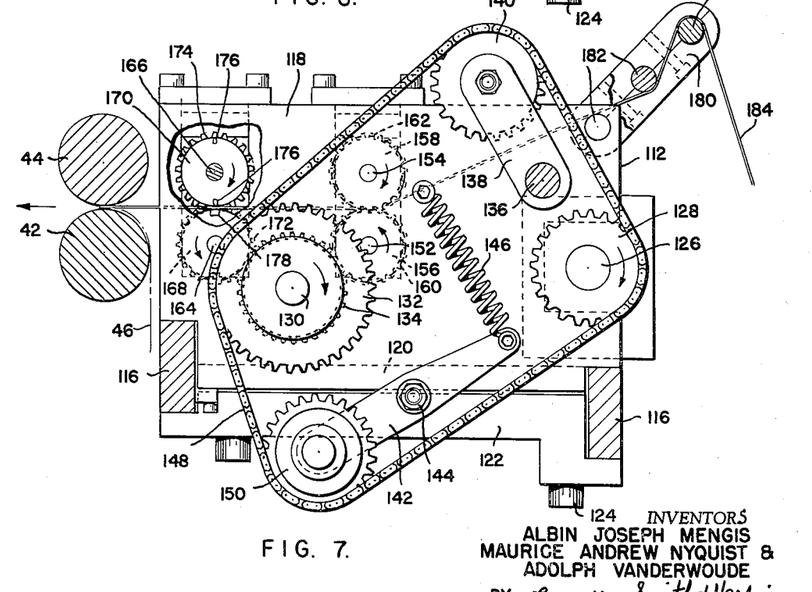
FIGURE 7 is an enlarged section in line 7—7 of FIGURE 2.
Figure 8:
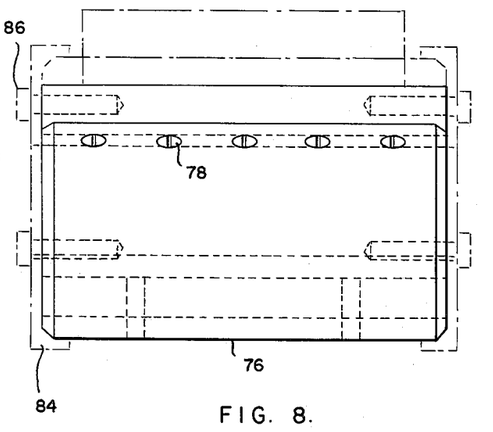
FIGURE 8 is a side elevation of the gum roller, the gum applicator shoe being shown in phantom.
Figure 9:
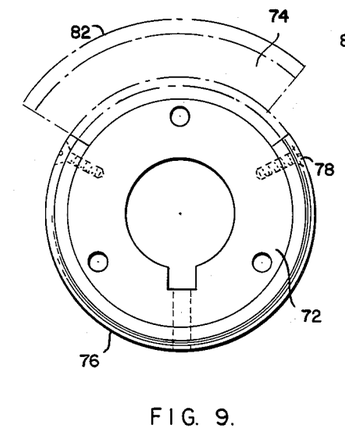
FIGURE 9 is an end view of the gum roller shown in FIGURE 8.
Figure 10:
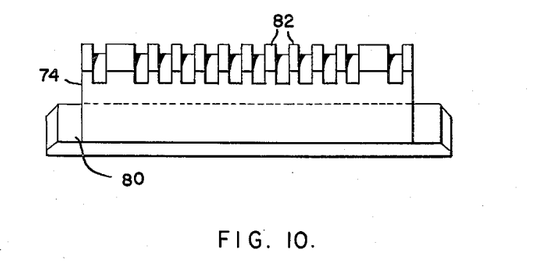
FIGURE 10 is a side elevation of the gum applicator shoe.
Figure 11:
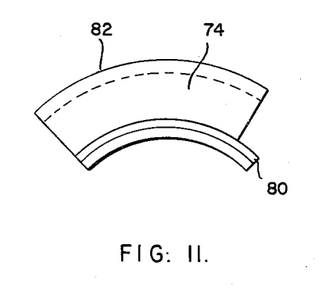
FIGURE 11 is an end view of the gum applicator shoe shown in FIGURE 10.
Figure 12:
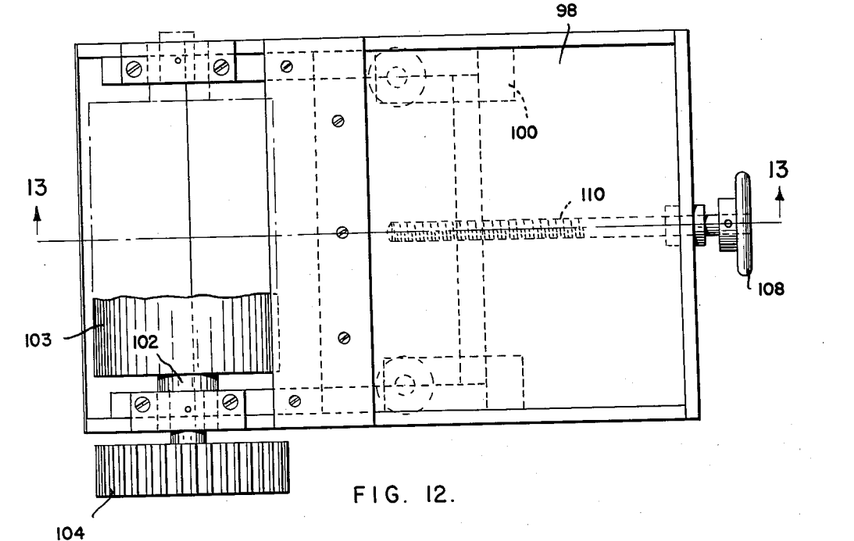
FIGURE 12 is a plan view of the gum box shown alone.
Figure 13:
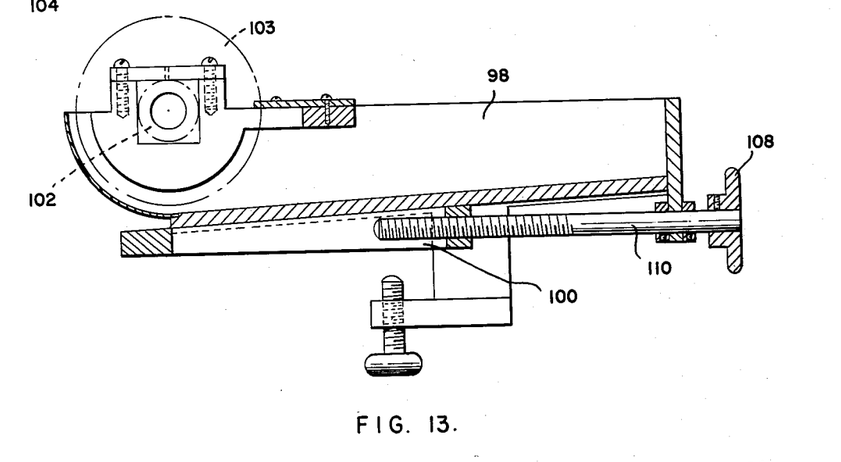
FIGURE 13 is a section on line 13—13 of FIGURE 12.
Figure 14:
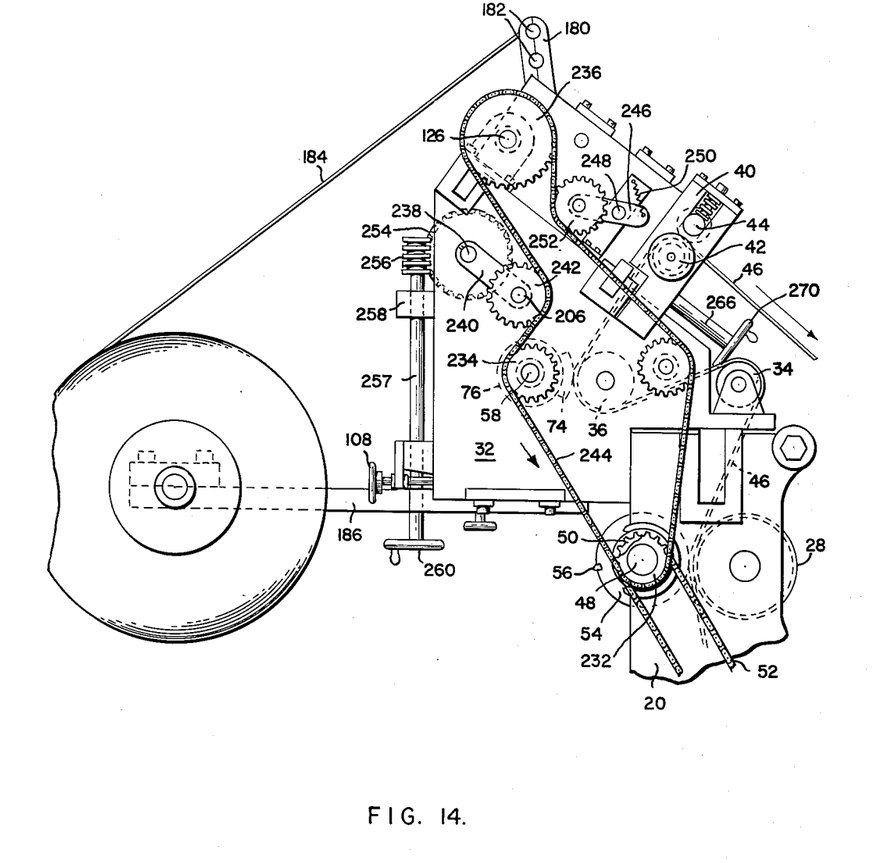
FIGURE 14 is an elevation showing the side of the machine opposite to that shown in FIGURE 1.

Referring particularly to FIG. 14, mounted upon the main drive shaft 48, gumming roller shaft 58 and the shaft 126 respectively are chain sprockets 232, 234 and 236. Intermediate the chain sprockets 234 and 236 is a worm wheel shaft 238 to which is rigidly secured an arm 240. Upon the latter is mounted a chain sprocket 242 which meshes with a link belt 244 trained over the sprockets 232, 234 and 236. On the opposite side of the link belt is a belt tightening device comprising an arm 246 that is pivoted at 248 and biased by a tension spring 250. Upon one end of the arm 246 is mounted a chain sprocket 252 that meshes with the chain belt 244. The worm wheel shaft 238 carries a worm gear 254, and meshing with the latter is a worm 256 that is mounted upon a shaft 257 suitably supported by and journaled in the side frame extension 30, as at 258, and provided with a hand wheel 260. In the operation of the machine when the hand wheel 260 is manipulated, the worm 256 turns the worm wheel 254, in consequence of which the arm 240 swings the chain sprocket 242 in an arc. Simultaneously, the chain tightening device acts to keep the link belt suitably taut.

The worm wheel shaft 136 also carries a worm wheel 262, and meshing with the latter is a worm 264 mounted upon a shaft 266 suitably supported by and journaled in the side frame extension 30, as at 268, and provided with a hand wheel 270. In the operation of the machine when the hand wheel 270 is manipulated the worm 264 turns the worm wheel 262 and the latter turns the shaft 136.

The machine, as illustrated, is arranged to apply laterally spaced patches to each successive bag paper section, in consequence of which the gumming roller shaft 58 must make one revolution for each revolution of the main drive shaft 48, and the effective radius of the applicator shoes mounted upon the shaft 58 must correspond to the effective radius of the circle described by the outer extremity of the perforator 56. Because there are two cutter elements carried by each of the rollers 170 and 222 the shaft 126 for driving the patch applying units must rotate at such a rate that the rollers 170 and 222 make one-half of a revolution for each revolution of the shafts 48 and 58. In addtion, the main drive shaft 48, gumming roller shaft 58, and the shaft 126 must be suitably angularly oriented so that gum is applied to the areas of the bag paper sections to which the patch paper is to be applied. It will be understood of course that fine adjustment of the machine may be necessary because of misapplication of the patches to the bag paper. It may be desired to shift all of the patches a short distance forwardly or all of the patches rearwardly on the successive bag sections or to shift one row of patches forwardly or rearwardly relative to the other row thereof. The first type of adjustment is effected by manipulation of the handwheel 260, in consequence of which the effective length of the link belt 244 extending between the chain sprockets 234 and 236 is changed and these sprockets are turned relative to one another to effect a suitable change in the phase of operation of the patch applying units relative to the means for advancing and perforating the bag paper web 46. The second type of adjustment is made by manipulating the handwheel 270, in consequence of which the effective length of the link belt between the sprockets 128 and 132 is changed and the sprockets 128 and 132 turn relative to one another thereby to effect a corresponding change between the phase of operation of the patch applying units 112 and 114. It is particularly important to observe that either type of the foregoing adjustments may be effected while the machine is in full operation.

It will be understood, of course, that the present invention is susceptible of various changes and modifications which may be made from time to time without involving any departure from the general principles or real spirit thereof, and accordingly it is intended to claim the same as broadly as well as specifically as indicated in the appended claims.

What is claimed is:

1. A bag making machine comprising first means for continuously advancing a web of bag material having successive sections of equal length severable from said web of bag material, second means adapted for operation in predetermined phase relation to said first means and operable for continuously advancing a web of reinforcing material, severing lengths therefrom and applying the latter to said advancing web of bag material at regular intervals and in corresponding positions on the successive sections of bag material, and means operable during advance of said webs for varying the phase relation between said first and second means thereby to shift said corresponding positions of said lengths of reinforcing material on the successive sections of bag material including a drive operatively interposed between said first and second means, said drive having driving and driven members associated with said first and second means, an endless belt trained over and non-slippingly engaged with said members, and means for selectively varying the effective belt length on one side of said drive thereby to turn said members relative to one another.

2. A bag making machine comprising first means for continuously advancing a web of bag material having successive sections of equal length severable from said web of bag material, second means including a plurality of laterally spaced units adapted for operation in predetermined phase relation to said first means and to one another and each operable for continuously advancing a web for reinforcing material, severing lengths therefrom and applying the latter to said advancing web of bag material at regular intervals and in corresponding positions on the successive sections of bag material, and means operable during advance of said webs for varying the phase relation between said first and second means thereby to shift said corresponding positions of said lengths of reinforcing material on the successive sections of bag material, and for varying the phase relation between said units thereby to shift the corresponding positions of said lengths of reinforcing material applied by one of said units relative to the corresponding positions of said lengths of reinforcing material applied by the others of said units.

3. A bag making machine as defined in claim 2 wherein the phase varying means comprises common driving means for all of the units operable for advancing the webs of reinforcing material, a driven member associated with one of said units, and endless link drive belt trained over said common driving means and driven member, and means for selectively varying the effective belt length on one side of said drive thereby to turn said drive means and driven member relative to one another.

4. A bag making machine as defined in claim 2 wherein the phase varying means comprises common driving means for all of the units operable for advancing the webs of reinforcing material, a driven member associated with one of said units, said common driving means and driven member being revoluble respectively about fixed axes, an endless link drive belt trained over said common driving means and driven member, and means for selectively varying the effective belt length on one side of said drive without changing the number of links in said belt thereby to turn said common drive means and driven member relative to one another including yieldable means on the other side of said drive for automatically taking up slack in said belt.

5. A bag making machine as defined in claim 2 wherein the phase varying means comprises a first driving member, common driving means for all of the units operable for advancing the webs of reinforcing material, a first endless link drive belt trained over said first driving member and said common driving means, means for selectively varying the effective belt length on one side of said first drive thereby to turn said first driving member and said common driving means relative to one another, a driven member associated with one of said units, a second endless link drive belt trained over said common driving means and driven member, and means for selectively varying the effective belt length on one side of said second drive thereby to turn said common driving means and driven member relative to one another.

6. A bag making machine comprising first means for continuously advancing a web of bag material having successive sections of equal length severable from said web of bag material, means for applying an adhesive agent to predetermined areas of said advancing web, second means adapted for operation in predetermined phase relation to said first means and operable for continuously advancing a web of reinforcing material, severing lengths therefrom and applying the latter to the adhesive coated areas of said bag material at regular intervals and in corresponding positions on the successive sections of bag material, and means operable during advance of said webs for varying the phase relation between said first and second means thereby to shift said corresponding positions of said lengths of reinforcing material on the successive sections of bag material including a drive operatively interposed between said first and second means, said drive having driving and driven members associated with said first and second means, an endless belt trained over and non-slippingly engaged with said members, and means for selectively varying the effective belt length on one side of said drive thereby to turn said members relative to one another.

7. An attachment for a bag making machine operable for continuously advancing a web of bag material comprising a plurality of laterally spaced units adapted for operation in predetermined phase relation to one another and each operable for continuously advancing a web of reinforcing material, severing lengths therefrom and applying the latter to said advancing web of bag material at regular intervals, and means operable during advance of said webs for varying the phase relation between said units thereby to shift the lengths of reinforcing material applied by one of said units lengthwise of the work relative to the lengths of reinforcing material applied by the others of said units.

8. An attachment for a bag making machine as defined in claim 7 wherein the phase varying means comprises common driving means for all of the units operable for advancing the webs of reinforcing material, a driven member associated with one of said units, and endless link drive belt trained over said common driving means and driven member, and means for selectively varying the effective belt length on one side of said drive thereby to turn said drive means and driven member relative to one another.

9. A bag making machine comprising first means for continuously advancing a web of bag material having successive sections of equal length severable from said web of bag material, second means adapted for operation in predetermined phase relation to said first means and operable for continuously advancing a web of reinforcing material, severing lengths therefrom and applying the latter to said advancing web of bag material at regular intervals and in corresponding positions on the successive sections of bag material, and means operable during advance of said webs for varying the phase relation between said first and second means thereby to shift said corresponding positions of said lengths of reinforcing material on the successive sections of bag material including a drive operatively interposed between said first and second means, said drive having driving and driven members respectively associated with said first and second means, an endless link belt trained over said members, and means for selectively varying the effective belt length on one side of said drive thereby to turn said members relative to one another.

10. A bag making machine comprising first means for continuously advancing a web of bag material having successive sections of equal length severable from said web of bag material, second means adapted for operation in predetermined phase relation to said first means and operable for continuously advancing a web of reinforcing material, severing lengths therefrom and applying the latter to said advancing web of bag material at regular intervals and in corresponding positions on the successive sections of bag material, and means operable during advance of said webs for varying the phase relation between said first and second means thereby to shift said corresponding positions of said lengths of reinforcing material on the successive sections of bag material including a drive operatively interposed between said first and second means, said drive having driving and driven members respectively associated with said first and second means and revoluble about fixed axes, an endless link belt trained over said members, and means for selectively varying the effective belt length on one side of said drive without changing the number of links in said belt thereby to turn said members relative to one another including yieldable means on the other side of said drive for automatically taking up slack in said belt.

References Cited in the file of this patent

UNITED STATES PATENTS

| | | |
|---|---|---|
| 2,016,954 | Beck | Oct. 8, 1935 |
| 2,070,205 | Heywood | Feb. 9, 1937 |
| 2,266,605 | Jones et al. | Dec. 16, 1941 |
| 2,844,075 | Davis et al. | July 22, 1950 |
| 2,880,656 | Welsh | Apr. 7, 1959 |